(12) United States Patent
Smith et al.

(10) Patent No.: US 7,776,392 B2
(45) Date of Patent: Aug. 17, 2010

(54) COMPOSITE INSULATION TAPE WITH LOADED HTC MATERIALS

(75) Inventors: James D. B. Smith, Monroeville, PA (US); Gary Stevens, Surrey (GB); John W. Wood, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 694 days.

(21) Appl. No.: 11/396,990

(22) Filed: Apr. 3, 2006

(65) Prior Publication Data

US 2006/0231201 A1    Oct. 19, 2006

Related U.S. Application Data

(63) Continuation-in-part of application No. 11/106,846, filed on Apr. 15, 2005.

(51) Int. Cl.
*B05D 1/36* (2006.01)
(52) U.S. Cl. .................... 427/203; 427/407.1; 427/202; 427/201
(58) Field of Classification Search .............. 427/407.1, 427/201, 202, 203
See application file for complete search history.

(56) References Cited

U.S. PATENT DOCUMENTS

| 3,246,271 | A | 4/1966 | Ford |
| 3,866,316 | A | 2/1975 | Takechi et al. |
| 3,974,302 | A | 8/1976 | Croop et al. |
| 4,001,616 | A | 1/1977 | Lonseth et al. |
| 4,160,926 | A | 7/1979 | Cope et al. |
| 4,335,367 | A | 6/1982 | Mitsui et al. |
| 4,361,661 | A | 11/1982 | Jackson |
| 4,400,226 | A | 8/1983 | Horrigan |
| 4,427,740 | A | 1/1984 | Stackhouse et al. |
| 4,634,911 | A | 1/1987 | Studniarz et al. |
| 4,694,064 | A | 9/1987 | Tomalia et al. |
| 4,704,322 | A | 11/1987 | Roberts |
| 4,760,296 | A | 7/1988 | Johnston et al. |
| 4,806,806 | A * | 2/1989 | Hjortsberg et al. ............ 310/45 |
| 5,011,872 | A | 4/1991 | Latham et al. |

(Continued)

FOREIGN PATENT DOCUMENTS

EP        0 157 936 A1      10/1985

(Continued)

OTHER PUBLICATIONS

Brutsch et al. "New High Voltage Insulation with Increased Thermal Conductivity" Electrical Electronics Insulation Conference 1993 Proceedings, (Oct. 1993).*

(Continued)

*Primary Examiner*—Michael Barr
*Assistant Examiner*—Robert S Walters, Jr.

(57) ABSTRACT

In one embodiment of the present invention as used for impregnating a composite tape (56) with HTC particles provides for permeating a fabric layer (51) of the composite tape with HTC particles and impregnating an impregnating resin into the composite tape through the fabric layer (51). At least 5% of the HTC particles permeated into the fabric layer are carried out of the fabric layer and into a mica layer (52) bound to the fabric layer by the impregnating resin. In some embodiments the impregnating resin itself contains HTC particles.

20 Claims, 1 Drawing Sheet

U.S. PATENT DOCUMENTS

| | | | |
|---|---|---|---|
| 5,037,876 | A | 8/1991 | Birkle et al. |
| 5,126,192 | A | 6/1992 | Chellis et al. |
| 5,281,388 | A | 1/1994 | Palmer et al. |
| 5,466,431 | A | 11/1995 | Dorfman et al. |
| 5,510,174 | A | 4/1996 | Litman |
| 5,540,969 | A | 7/1996 | Schuler |
| 5,578,901 | A | 11/1996 | Blanchet-Fincher et al. |
| 5,688,382 | A | 11/1997 | Besen et al. |
| 5,723,920 | A | 3/1998 | Markovitz et al. |
| 5,780,119 | A | 7/1998 | Dearnaley et al. |
| 5,801,334 | A | 9/1998 | Theodorides |
| 5,878,620 | A | 3/1999 | Gilbert et al. |
| 5,904,984 | A | 5/1999 | Smith et al. |
| 5,938,934 | A | 8/1999 | Balogh et al. |
| 5,982,056 | A | 11/1999 | Koyama et al. |
| 6,015,597 | A | 1/2000 | David |
| 6,048,919 | A | 4/2000 | McCullough |
| 6,103,382 | A | 8/2000 | Smith et al. |
| 6,130,495 | A | 10/2000 | Schulten et al. |
| 6,130,496 | A | 10/2000 | Takigawa et al. |
| 6,140,590 | A | 10/2000 | Baumann et al. |
| 6,160,042 | A | 12/2000 | Ishida |
| 6,190,775 | B1 | 2/2001 | Smith et al. |
| 6,238,790 | B1 | 5/2001 | Smith et al. |
| 6,251,978 | B1 | 6/2001 | McCullough |
| 6,255,738 | B1 | 7/2001 | Distefano et al. |
| 6,261,424 | B1 | 7/2001 | Goncharenko et al. |
| 6,261,481 | B1 | 7/2001 | Akatsuka et al. |
| 6,265,068 | B1 | 7/2001 | David et al. |
| 6,288,341 | B1 * | 9/2001 | Tsunoda et al. ......... 174/137 B |
| 6,344,271 | B1 | 2/2002 | Yadav et al. |
| 6,359,232 | B1 * | 3/2002 | Markovitz et al. .......... 174/209 |
| 6,393,642 | B1 | 5/2002 | Pollman et al. |
| 6,396,864 | B1 | 5/2002 | O'Brien et al. |
| 6,432,537 | B1 | 8/2002 | Devlin et al. |
| 6,504,102 | B2 | 1/2003 | Tsunoda et al. |
| 6,506,331 | B2 | 1/2003 | Meguriya |
| 6,509,063 | B1 | 1/2003 | McCarthy et al. |
| 6,548,172 | B2 | 4/2003 | David et al. |
| 6,572,937 | B2 | 6/2003 | Hakovirta et al. |
| 6,632,561 | B1 | 10/2003 | Bauer et al. |
| 6,635,720 | B1 | 10/2003 | Tomalia et al. |
| 6,746,758 | B2 | 6/2004 | Tsunoda et al. |
| 6,821,672 | B2 | 11/2004 | Zguris |
| 6,882,094 | B2 | 4/2005 | Dimitrijevic et al. |
| 6,905,655 | B2 | 6/2005 | Gabriel et al. |
| 6,974,627 | B2 | 12/2005 | Morita et al. |
| 7,033,670 | B2 | 4/2006 | Smith |
| 7,042,346 | B2 | 5/2006 | Paulsen |
| 7,120,993 | B2 | 10/2006 | Yamamoto et al. |
| 7,180,409 | B2 | 2/2007 | Brey |
| 7,189,778 | B2 | 3/2007 | Tobita et al. |
| 7,425,366 | B2 | 9/2008 | Okamoto, et al. |
| 2002/0058140 | A1 | 5/2002 | Dana et al. |
| 2002/0070621 | A1 | 6/2002 | Mori et al. |
| 2002/0098285 | A1 | 7/2002 | Hakovirta et al. |
| 2002/0146562 | A1 | 10/2002 | Morita et al. |
| 2003/0035960 | A1 | 2/2003 | Tsunoda et al. |
| 2003/0040563 | A1 | 2/2003 | Sagal et al. |
| 2003/0139510 | A1 | 7/2003 | Sagal et al. |
| 2004/0094325 | A1 | 5/2004 | Yoshida et al. |
| 2004/0102597 | A1 | 5/2004 | Tobita et al. |
| 2004/0152829 | A1 | 8/2004 | Tobita et al. |
| 2004/0241439 | A1 | 12/2004 | Morita et al. |
| 2005/0097726 | A1 | 5/2005 | Yamamoto et al. |
| 2005/0116336 | A1 | 6/2005 | Chopra et al. |
| 2005/0161210 | A1 | 7/2005 | Zhong et al. |
| 2005/0208301 | A1 | 9/2005 | Okamoto et al. |
| 2005/0236606 | A1 | 10/2005 | Toas et al. |
| 2005/0245644 | A1 | 11/2005 | Smith et al. |
| 2005/0274450 | A1 | 12/2005 | Smith et al. |
| 2005/0274540 | A1 | 12/2005 | Smith et al. |
| 2005/0274774 | A1 | 12/2005 | Smith et al. |
| 2005/0277349 | A1 | 12/2005 | Smith et al. |
| 2005/0277350 | A1 | 12/2005 | Smith et al. |
| 2005/0277351 | A1 | 12/2005 | Smith et al. |
| 2005/0277721 | A1 | 12/2005 | Smith et al. |
| 2006/0034787 | A1 | 2/2006 | Bujard |
| 2006/0142471 | A1 | 6/2006 | Shindo |
| 2006/0231201 | A1 | 10/2006 | Smith et al. |
| 2006/0234027 | A1 | 10/2006 | Huusken |
| 2006/0234576 | A1 | 10/2006 | Smith et al. |
| 2006/0258791 | A1 * | 11/2006 | Okamoto et al. ............ 524/449 |
| 2006/0280873 | A1 | 12/2006 | Smith et al. |
| 2006/0281380 | A1 | 12/2006 | Smith et al. |
| 2006/0281833 | A1 | 12/2006 | Smith et al. |
| 2007/0026221 | A1 | 2/2007 | Stevens et al. |
| 2007/0114704 | A1 | 5/2007 | Stevens et al. |
| 2007/0141324 | A1 | 6/2007 | Stevens et al. |
| 2008/0050580 | A1 | 2/2008 | Stevens et al. |
| 2008/0066942 | A1 | 3/2008 | Miller |
| 2008/0262128 | A1 | 10/2008 | Stevens et al. |

FOREIGN PATENT DOCUMENTS

| | | |
|---|---|---|
| EP | 0 266 602 A1 | 5/1988 |
| EP | 0 394 767 A2 | 10/1990 |
| EP | 0 604 804 A2 | 7/1994 |
| EP | 1 220 240 A1 | 7/2002 |
| EP | 1 300 439 A1 | 4/2003 |
| EP | 1 383 226 A1 | 1/2004 |
| EP | 1 384 567 A1 | 1/2004 |
| EP | 1 486 997 A1 | 12/2004 |
| EP | 1 530 223 A1 | 5/2005 |
| GB | 881036 A2 | 11/1961 |
| JP | 56029305 | 3/1981 |
| JP | 03205443 A | 9/1991 |
| JP | 06313267 A | 11/1994 |
| JP | 08-020673 A | 1/1996 |
| JP | 10-088201 | 4/1998 |
| JP | 10-211659 | 8/1998 |
| JP | 2002212422 A | 7/2002 |
| JP | 2002-322243 A | 11/2002 |
| JP | 200506389 A | 1/2005 |
| JP | 2005-199562 * | 7/2005 |
| WO | WO 95/02504 A1 | 1/1995 |
| WO | WO 96/28073 A1 | 9/1996 |
| WO | WO 98/41993 A1 | 9/1998 |
| WO | WO 99/26286 A1 | 5/1999 |
| WO | WO 00/56127 A1 | 9/2000 |
| WO | WO 01/68749 A1 | 9/2001 |
| WO | WO 01/84659 A1 | 11/2001 |
| WO | WO 03/040445 A1 | 5/2003 |
| WO | WO 2004/006271 A1 | 1/2004 |
| WO | WO 2004/052999 A2 | 6/2004 |
| WO | WO 2004/067606 A1 | 8/2004 |
| WO | WO 2005/069312 A1 | 7/2005 |
| WO | WO 2005/106089 * | 11/2005 |
| WO | WO 2005/123825 A2 | 12/2005 |
| WO | WO 2005/124790 A2 | 12/2005 |
| WO | WO 2006/002014 A1 | 1/2006 |
| WO | WO 2006/007385 A1 | 1/2006 |

OTHER PUBLICATIONS

Sun et al. "Fundamental Research on Surface Modification of Nano-size Silica for Underfill Applications" 2004 Electronic Components and Technology Conference (2004).*

Tari et al. "A High Voltage Insulating System with Increased Thermal Conductivity for Turbo Generators" Coil Winding, Insulation and Electrical Manufacturing Conference (2001).*

Tari et al. "Impacts on Turbine Generator Design by the Application of Increased Thermal Conducting Stator Insulation" Cigre SC11-01 Meeting, Paper No. 132 (2002).*

Von Roll Isola, "Mica Tapes," product literature, 381.58, date unknown.

Tomoyuki Matsumura, "Phase Structures and Thermal and Conductive properties of Epoxy-Alumina Hybrids Filled with Conductive Fillers," STN database No. 2002:257918, Apr. 8, 2007.

Yasufumi Shibata, "Lipophilic Inorgantic-Organic Hybrid Materials with Low Frictional Coefficient," STN database No. 2002:568167, Jul. 3, 2002, pp. 1-3.

Tari et al., "Impacts on Turbine Generator Design by the Application of Increased Thermal Conducting Stator Insulation" Cigre SC11-01 Meeting, Paper No. 132 (2002).

Sun et al., "Fundamental Research on Surface Modification of Nano-sized Silica for Underfill Applications" 2004 Electronic Components and Technology Conference (2004).

Brutsch et al., "New High Voltage Insulation with Increased Thermal Conductivity" Electrical Electronics Insulation Conference 1993 Proceedings, (Oct. 1993).

Tari et al., "A High Voltage System with Increased Thermal Conductivity for Turbo Generators" Coil Winding, Insulation and Electrical Manufacturing Conference (2001).

Derwent Acc-No. 1980-39239C (JP 55053802 A Derwent Abstract) (Nippon Mica Seisaku).

Product Data Sheet for Polar Therm Boron Nitride Powder Grades PT120, PT140, PT160, and Pt 180, provided by Momentive Performance Materials (2007).

Poss® Enhanced Thermosets, Product Brochure from Hybrid Products, Inc., date unknown.

Production Information Sheet for D.E.R.™ 330 (Liquid Epoxy Resin) from the Dow Chemical Co., date unknown.

\* cited by examiner

COMPOSITE INSULATION TAPE WITH LOADED HTC MATERIALS

CROSS-REFERENCE TO RELATED APPLICATIONS

This application is a continuation-in-part of U.S. application Ser. No. 11/106,846, "Insulation Paper with High Thermal Conductivity Materials" filed Apr. 15, 2005, by Smith, et al., which is incorporated herein by reference.

FIELD OF THE INVENTION

The field of the invention relates to insulation tapes, and more particularly to the loading of HTC materials into composite tapes.

BACKGROUND OF THE INVENTION

With the use of any form of electrical appliance, there is a need to electrically insulate conductors. With the push to continuously reduce the size and to streamline all electrical and electronic systems there is a corresponding need to find better and more compact insulators and insulation systems.

Good electrical insulators, by their very nature, also tend to be good thermal insulators, which is undesirable. Thermal insulating behavior, particularly for air-cooled electrical equipment and components, reduces the efficiency and durability of the components as well as the equipment as a whole. It is desirable to produce electrical insulation systems having maximum electrical insulation and minimal thermal insulation characteristics.

Though many factors affect the art of electrical insulation, the field would benefit even more from the ability to transfer heat, without reducing other desired physical characteristics of the insulators. What is needed is improved electrical insulation materials that have a thermal conductivity higher than that of conventional materials, but that does not compromise the electrical insulation and other performance factors including structural integrity.

Electrical insulation often appears in the form of tapes, which themselves have various layers. Common to these types of tapes is a paper layer that is bonded at an interface to a fiber layer, both layers tending to be impregnated with a resin. The paper layer will be composed of materials that are highly electrically insulating, such as mica. Improvements to mica tapes include catalyzed mica tapes as taught in U.S. Pat. No. 6,103,882. If the thermal conductivity of the paper, independent from or in conjunction with its use in a tape, can be improved then an electrical system will see a marked improvement. Other problems with the prior art also exist, some of which will be apparent upon further reading.

SUMMARY OF THE INVENTION

With the foregoing in mind, methods and apparatuses are consistent with the present invention, which inter alia facilitates the thermal conductivity of insulating paper by mixing high thermal conductivity (HTC) materials onto and/or into the host matrix of the insulating paper. The HTC materials of the present invention can be of a variety of types, such as nanofillers or surface coatings, and both nanofillers and surface coatings each comprise various sub-groups unto themselves. The HTC materials can be added to the paper at a variety of stages, such as when the paper is in its raw materials, or substrate, stage, when the paper is being formed, or after the paper has been formed. Mica is a particular kind of substrate for insulating paper due to its high electrical resistivity.

The insulating paper may stand alone or be combined with other materials to form an insulating tape. These other materials typically comprise a fibrous backing, such as glass, and a resin impregnator. The other materials may also be mixed with HTC materials to produce a combined HTC material tape product.

These and other objects, features, and advantages in accordance with the present invention are provided particular embodiments by impregnating a composite tape with HTC particles and provides for permeating a fabric layer of the composite tape with HTC particles and impregnating an impregnating resin into the composite tape through the fabric layer. At least 1% of the HTC particles, and more particularly at least 5% of the particles, permeated into the fabric layer are carried out of the fabric layer and into a mica layer, that is bound to the fabric layer by a separate bonding resin, by the impregnating resin, the impregnating resin being impregnated through the entire tape structure, usably after the tape has been wound onto an electrical object. In some embodiments the impregnating resin itself contains HTC particles.

In particular embodiments the permeating of the fabric layer is performed after the fabric layer is bound to the mica layer, and the fabric layer can have a resinous backcoating on a side opposite to the side which the mica layer is bound, whereby the resinous backcoating keeps the HTC particles within the fabric layer.

In other related embodiments the HTC particles are comprised of a mixture of small and larger groups of particles, and where the small group comprise particles in the 5-100 nm in length with aspect rations of 1-10 and comprises at least 5% of the total volume of HTC particles in the composite tape, and the larger groups of particles is generally greater than 100 nm in length. The small group of particles are comprised predominately of spheroid and platelet shapes.

In still other related embodiments, approximately 10% by volume of HTC particles accumulate at the fabric layer/mica layer interface, whereby a region of densely packed HTC particles is created at the interface. The HTC particles are dry when they are permeated into the fabric layer, or the HTC particles are mixed with resin when they are permeated into the fabric layer. The HTC particles comprise at least one of oxides, nitrides, and carbides, and more particularly, $Al_2O_3$, AlN, MgO, ZnO, BeO, BN, $Si_3N_4$, SiC or $SiO_2$ with mixed stoichiometric and non-stoichiometric combinations, and are from 1-1000 nm in length, and high thermal conductivity fillers have an aspect ratio of between 3-100.

In another embodiment of the present invention as used for impregnating a composite tape with HTC particles provides for dry packing a fabric layer of the composite tape with HTC particles, the HTC particles comprise a mixture of smaller and larger particles. Then sealing exposed surfaces of the fabric layer with a resin layer, and impregnating the composite tape with an impregnating resin. The resin layer is soluble in the impregnating resin, and the impregnating resin flows from the fabric layer into a mica layer bound to the fabric layer. At least 5% of the HTC particles in the fabric layer is carried by the impregnating resin into the mica layer, and where the smaller particles tend to be carried further than the larger particles, and some of the HTC particles remain at the fabric layer/mica layer interface whereby creating a region with a higher concentration of HTC particles. The HTC particles are at least one of oxides, nitrides, and carbides.

In some embodiments HTC particles have been surface functionalized, for instance, the smaller particles have been surface functionalized to limit interaction with other smaller particles. The HTC particles comprise 0.1-65% by volume of composite tape, and more particularly, 1-25% by volume. The number of HTC particles in the tape should be sufficient for percolation structures to form and cross the tape; this will be higher in the fabric than in the pore limited mica. These percolation structures may be contiguous, but also may have different forms through the tape. The concentrations in the fabric will be comparable to that for the filled resins and be related to aspect ratio. In the mica it will be less as the pore structure controls the number present for percolation to occur. The pore internal volume in the mica paper is between approximately 5 to 15% of the total volume for different porosity papers; therefore the volume concentration range for the mica layer itself can be between 0.01% to 10% (by factoring the 0.1 to 65% above). The mica component of HTC particles are those that have dimensions small enough to access the pore structure, which should be less than 500 nm, with more optimal sizes being less then 100 nm.

In still another embodiment of the present invention as used for impregnating a composite tape with HTC particles provides for joining a mica layer to at least one fabric layer and packing the fabric layer with HTC particles. Then sealing exposed surfaces of the fabric layer with a resin layer, and impregnating the composite tape with an impregnating resin. At least 5% of the HTC particles in the fabric layer is carried by the impregnating resin into the mica layer.

Other embodiments of the present invention also exist, which will be apparent upon further reading of the detailed description.

BRIEF DESCRIPTION OF THE FIGURES

The invention is explained in more detail by way of example with reference to the following drawing.

DETAILED DESCRIPTION OF THE INVENTION

Figure 1:
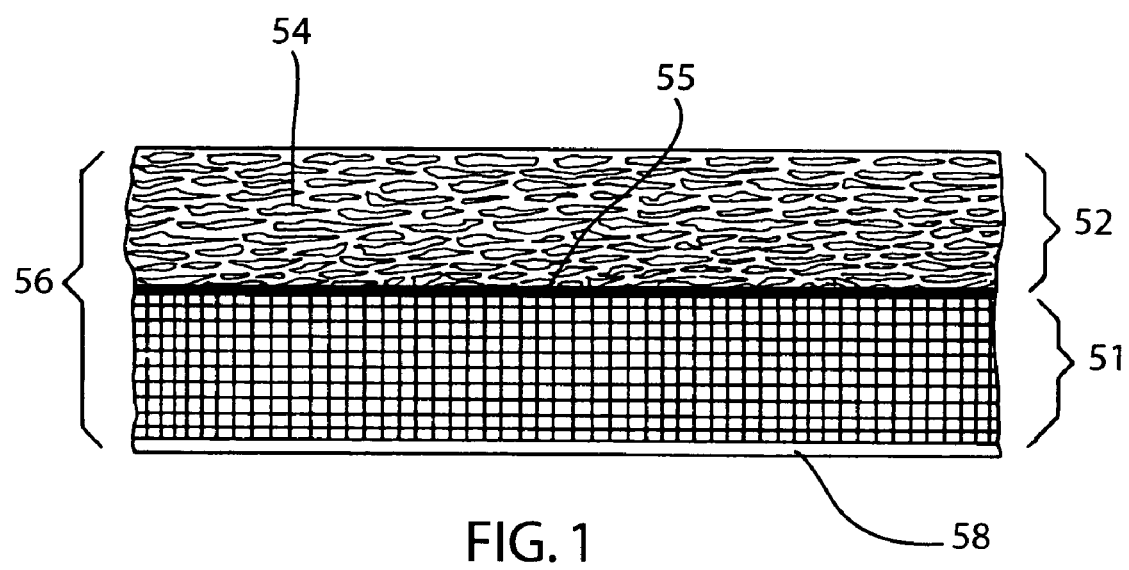
FIG. 1 illustrates a cross section of a composite tape being used with the present invention.

The present invention provides for the incorporation of high thermal conductivity (HTC) materials into and onto the substrate used in paper insulation, such as the types used in electrical insulating tapes. Insulating tapes tend to comprise a host matrix, such as mica, that is formed into a paper, that is often then impregnated with resin or accelerator or both. Before or after being impregnated, the paper used in tapes is added to a high tensile strength backing, such as glass or polymer film. The host matrix of an insulating tape acts as a very good electrical insulator, but also insulates thermally as well, which is an undesired side effect.

It is therefore desired to increase the thermal conductivity of the substrate. As used herein substrate refers to the host material that the insulating paper is formed from, while matrix refers to the more complete paper component made out of the substrate. These two terms may be used somewhat interchangeable when discussing the present invention. The increase of thermal conductivity should be accomplished without significantly impairing the electrical properties, such as dissipation factor, or the physical properties of the substrate, such as tensile strength and cohesive properties. The physical properties can even be improved in some embodiments, such as with surface coatings. In addition, in some embodiments the electrical resistivity of the host matrix can also be enhanced by the addition of HTC materials.

The HTC materials can be added to the substrate or matrix at one or more of the various stages of manufacture of the insulating paper. Distinct stages in the manufacture of an insulating paper exist. For the purpose of the present invention, these can be separated into three stages. The raw material stage, the slurry stage, and the paper product stage. For example, a mica paper begins as mica which is converted to flakes then to mica flakelets that are then combined with a liquid into a slurry, which is then run through a machine to produce a mica paper.

In addition to the standard mica (muscovite, phloqopite) that is typically used for electrical insulation, there is also biotite mica as well as several other mica-like alumino-silicate materials such as kaolinite, halloysite, montmorillonite and chlorite. Montmorillonite has lattices in its structure which can be readily impregnated with HTC materials such as metal cations, organic compounds and monomers and polymers to give high dielectric strength composites.

The addition of HTC materials can occur at any or all of the production stages. Each of these stages, of course, will comprise of multiple sub-stages at which the HTC material may be added. The process of applying the HTC materials at the various stages will have to account for the difference in physical characteristics of the host matrix at these various stages. For example, adding the HTC materials to loose mica flakes or mica flakelets is different than adding the materials to the mica in the slurry or the paper product. HTC materials may also be present in other component parts of the finished insulating tape, such as the backing fabric, or the interlayer bonding resins.

The process of manufacture of insulating paper combines thermal, chemical, and mechanical treatments individually or in combinations, to produce a pulp that is then transformed into sheets that make up the paper. HTC-materials can be added to the raw material stage either in the dry form or contained in a liquid or other medium. The HTC material is added to the substrate, such as dry mica flakelets, and intermixed to form, in one instance, a homogeneous distribution within the substrate. Methods such as heat may be used to remove the liquid medium that delivers the HTC materials to the substrate.

HTC materials are incorporated into the matrix at the slurry stage by adding them to a suspension in an agglomerated or non-agglomerated form in a liquid carrier. Aggregation of the HTC material is generally not preferred at this stage but in some cases it may be used depending on the nature of the aggregate structure. Surfactants, chemical surface preparation, or pH control may be used to ensure the particles do not aggregate or that they aggregate in particular ways. If the HTC are to some degree self aligning or can be aligned by external forces then full dispersion on mixing may not be necessary.

In the slurry stage the fillers may either be added as a powder or as a suspension in a liquid phase. The liquid can be of a variety of types used in the art, though water is typical. The water itself can be deionized, demineralized, or have additives to control its pH value.

To add the HTC materials into the paper product the fillers may be incorporated into a suitable solvent as a suspension. Examples are typical organic solvents such as hexane, toluene, methylethylketone etc. Similarly, it is desired that the HTC material be uniformly distributed in the liquid as a non-aggregated suspension. The size distribution of the particles may be chosen to fulfill the desired objective in relation to the void size distribution in host matrix. The HTC material size and shape distribution may be employed to influence the thermal conductivity and other physical properties, and use can be made of the different close packing behavior of such components or of their different aggregation or self-assembling behavior, to achieve this.

At the slurry or paper product stage, the solvents may also contain one or more accelerators, such a zinc naphthenate and other metal-salts or organometallics, which may be used to accelerate the reaction of a later impregnated resin. HTC material can be added together with the accelerator in a common solvent or accelerator.

The present invention inserts HTC materials into a host matrix, or substrate, such as a mica and polyester. Other substrate components include glass flakes, and Kapton™, which is a polyimide, or Mylar® which is a polyester such as polyethylene terephthalate. The HTC materials can be applied to any and all external and internal surfaces. Although flakes are a common first stage substrate, some types of substrate materials may use different physical formations, or even combinations of physical formations that can form composite paper that can be multi-layered or continuous.

The term HTC material refers to particles that increase the thermal conductivity of the host matrix. In one embodiment these are nanofillers having dimensions of about 1-1000 nm. These may be spherical, platelets or have a high aspect ratio such as whiskers, rods or nanotubes, and their related assembled forms such as aggregates, fibrillar dendrites, ropes, bundles and nets and other forms. In addition, HTC materials also refers to coatings, such as diamond like coatings (DLC) and various metal oxides, nitrides, carbides and mixed stoichiomertric and non-stoichiometric combinations that can be applied to the host matrix. As will be discussed, it is possible to combine HTC materials, such as combination of nano, meso or micro spheres and rods, or a DLC or metal oxide coating on nano, meso or micro particulates. It is also important to note that there may be diamond nanofillers of various forms, which are distinct from diamond like coatings. Since many paper insulators are eventually impregnated with resins, it is an objective of these embodiments that the HTC materials increase the thermal conductivity of the matrix after impregnation. After impregnation the particles may cause an increase in thermal conductivity by forming a thermally conducting network on the surfaces of the host matrix particles or with the impregnating resin or some combination of both. The impregnating resin may also have HTC materials of its own, which can act in conjunction with, or independent of the HTC materials added into the insulating paper.

The HTC materials therefore further comprise nano, meso, and micro inorganic HTC-materials such as silica, alumina, magnesium oxide, silicon carbide, boron nitride, aluminium nitride, zinc oxide and diamond, as well as others, that give higher thermal conductivity. These materials can have a variety of crystallographic and morphological forms and they may be processed with the host matrix either directly or via a solvent which acts as a carrier liquid. Solvents may be the preferred delivery system when the HTC-materials are added into the matrix at stages such as the paper product.

In one embodiment, the HTC materials are dendrimers, and in another embodiment they are nano or micro inorganic fillers having a defined size or shape including high aspect ratio particles with aspect ratios (ratio mean lateral dimension to mean longitudinal dimension) of 3 to 100 or more, with a more particular range of 10-50.

In one embodiment the surface coating of nano, meso and micro inorganic fillers having the desired shape and size distribution and the selected surface characteristics and bulk filler properties are complimentary to each other. This enables better percolation of the host matrix and independent interconnection properties are controlled independently while maintaining required bulk properties.

In regards to shape, the present invention utilizes shapes tending towards natural rods and platelets for enhanced percolation in the host matrix with rods being the most preferred embodiment including synthetically processed materials in addition to those naturally formed. A rod is defined as a particle with a mean aspect ratio of approximately 5 or greater, with particular embodiments of 10 or greater, though with more particular embodiments of no greater than 100. In one embodiment, the axial length of the rods is approximately in the range 10 nm to 100 microns. Smaller rods will percolate a host matrix better when added to a finished host matrix using a solvent.

Many micro particles form spheroidal, ellipsoidal and discoidal shapes, which have reduced ability to distribute evenly under certain conditions and so may lead to aggregated filamentary structures that reduce the concentration at which percolation occurs. By increasing the percolation, the thermal properties of the substrate can be increased, or alternately, the amount of HTC material that needs to be added to the substrate can be reduced. Also, the enhanced percolation results in a more uniform distribution of the HTC materials within the substrate rather than agglomeration which is to be avoided, creating a more homogenous product that is less likely to have undesired interfaces, incomplete particle wetting and micro-void formation. Likewise aggregated filamentary or dendritic structures, rather than globular (dense) aggregates or agglomerates, formed from higher aspect ratio particles confer enhanced thermal conductivity In one embodiment the dendrimer comprises discrete organic-dendrimer composites in which the organic-inorganic interface is non-discrete with the dendrimer core-shell structure. Dendrimers are a class of three-dimensional nanoscale, core-shell structures that build on a central core. The core may be on of an organic or inorganic material. By building on a central core, the dendrimers are formed by a sequential addition of concentric shells. The shells comprise branched molecular groups, and each branched shell is referred to as a generation. Typically, the number of generations used is from 1-10, and the number of molecular groups in the outer shell increase exponentially with the generation. The composition of the molecular groups can be precisely synthesized and the outer groupings may be reactive functional groups. Dendrimers are capable of linking with a host matrix, as well as with each other. Therefore, they may be added to a host as an HTC material.

Generally, the larger the dendrimer, the greater its ability to function as a phonon transport element. However, its ability to permeate the material and its percolation potential can be adversely affected by its size so optimal sizes are sought to achieve the balance of structure and properties required. Like other HTC materials, solvents can be added to the dendrimers so as to aid in their impregnation of a substrate, such as a mica or a glass tape. In many embodiments, dendrimers will be used with a variety of generations with a variety of different molecular groups.

Commercially available organic dendrimer polymers include polvamidoamine dendrimers (PAMAM) poly(propylene imine) dendrimers (PPI), and poly(amidoamine-organosilicon) (PAMAM-OS), which is a dendrimer with a PAMAM interior structure and an organo-silicon (OS) exterior. The former two are available from Aldrich Chemical™ and the last one from Dow-Corning™.

Similar requirements exist for inorganic-organic dendrimers which may be reacted together or with the substrate. In this case the surface of the dendrimer could contain reactive groups similar to those specified above which will either allow dendrimer-dendrimer, dendrimer-organic, dendrimer-hybrid, and dendrimer-HTC matrix reactions to occur. In this case the dendrimer will have an inorganic core and an organic shell, or vice-versa containing either organic or inorganic reactive groups or ligands of interest. It is therefore also possible to have an organic core with an inorganic shell which also contains reactive groups such as hydroxyl, silanol, vinyl-silane, epoxy-silane and other groupings which can participate in inorganic reactions similar to those involved in common sol-gel chemistries.

The molecular groups can be chosen for their ability to react, either with each other or with a substrate. However, in other embodiments, the core structure of the dendrimers will be selected for their own ability to aid in thermal conductivity; for example, metal oxides as discussed below.

In another embodiment the present invention provides for new electrical insulation materials based on organic-inorganic composites. The thermal conductivity is optimized without detrimentally affecting other insulation properties such as dielectric properties (permittivity and dielectric loss), electrical conductivity, electric strength and voltage endurance, thermal stability, tensile modulus, flexural modulus, impact strength and thermal endurance in addition to other factors such as viscoelastic characteristics and coefficient of thermal expansion, and overall insulation. Organic and inorganic phases are constructed and are selected to achieve an appropriate balance of properties and performance.

Micro and nano HTC particles may be selected on their ability to self aggregate into desired shapes, such as rods and platelets. Particles may be selected for their ability to self-assemble naturally, though this process may also be amplified by external forces such as an electric field, magnetic field, sonics, ultra-sonics, pH control, use of surfactants and other methods to affect a change to the particle surface charge state, including charge distribution, of the particle. In a particular embodiment, particles that exemplify surface coatings, such as boron nitride, aluminum nitride, diamond are made to self assemble into desired shapes. In this manner, the desired rod-shapes can be made from highly thermally conductive materials at the outset or assembled during incorporation into the host matrix.

In many embodiments, the size and shape of the HTC-materials are varied within the same use. Ranges of size and shape are used in the same product. A variety of long and shorter variable aspect ratio HTC-materials will enhance the thermal conductivity of a host matrix, as well as potentially provide enhanced physical properties and performance. One aspect that should be observed, however, is that the particle length does not get so long as to cause bridging between layers of substrate/insulation unless this is by design. Also, a variety of shapes and length will improve the percolation stability of the HTC-materials by providing a more uniform volume filing and packing density, resulting in a more homogeneous matrix. When mixing size and shapes, in one embodiment the longer particles are more rod-shaped, while the smaller particles are more spheroidal, platelet or discoid and even cuboids. For example a matrix containing HTC-materials could contain as low as about 0.1% to as high as 65% HTC materials by volume, with a more particular range begin about 1-25% by volume.

In a related embodiment, the HTC materials may have a defined size and shape distribution. In both cases the concentration and relative concentration of the filler particles is chosen to enable a bulk connecting (or so-called percolation) structure to be achieved which confers high thermal conductivity with and without volume filling to achieve a structurally stable discrete two phase composite with enhanced thermal conductivity. In another related embodiment, the orientation of the HTC materials increases thermal conductivity. In still another embodiment, the surface coating of the HTC materials enhances phonon transport. These embodiments may stand apart from other embodiments, or be integrally related. For example, dendrimers are combined with other types of highly structured materials such as thermoset and thermoplastic materials. They are uniformly distributed through a host matrix such that the HTC materials reduce phonon scattering and provide micro-scale bridges for phonons to produce good thermally conducting interfaces between the HTC materials. The highly structured materials are aligned so that thermal conductivity is increased along a single direction to produce either localized or bulk anisotropic electrically insulating materials. In another embodiment HTC is achieved by surface coating of lower thermal conductivity fillers with metal oxides, carbides or nitrides and mixed systems having high thermal conductivity which are physically or chemically attached to fillers having defined bulk properties, such attachment being achieved by processes such as chemical vapour deposition and physical vapour deposition and also by plasma treatment.

The addition of surface functional groups may include hydroxyl, carboxylic, amine, epoxide, silane or vinyl groups which will be available for chemical reaction with the host matrix. These functional groups may be naturally present on the surface of inorganic fillers or they may be applied using wet chemical methods, non-equilibrium plasma deposition including plasma polymerization, chemical vapour and physical vapour deposition, sputter ion plating and electron and ion beam evaporation methods.

Organic surface coatings, and inorganic surface coatings such as, metal-oxide, -nitride, -carbide and mixed systems may be generated which, when combined with the selected particle size and shape distribution, provide a defined percolation structure with control of the bulk thermal and electrical conductivity of the insulation system while the particle permittivity may be chosen to control the permittivity of the system.

Reactive surface functional groups may be formed from surface groups intrinsic to the inorganic coating or may be achieved by applying additional organic coatings both of which may include hydroxyl, carboxylic, amine, epoxide, silane, vinyl and other groups which will be available for chemical reaction with the host matrix. These single or multiple surface coatings and the surface functional groups may be applied using wet chemical methods, non-equilibrium plasma methods including plasma polymerization and chemical vapour and physical vapour deposition, sputter ion plating and electron and ion beam evaporation methods.

Diamond-Like Carbon Coatings (DLC) have high hardness, low friction, chemical inertness, and can combine high electrical resistivity ($\sim 10^{13}$ Ohm cm) for electrical insulation with high thermal conductivity (>1000 W/mK). There are several methods for producing a DLC, such as plasma assisted chemical vapor deposition (PACVD), physical vapor deposition(PVD), and ion beam deposition(IBD). In general, the DLC is less than one micron thick and is of amorphous carbon and hydrocarbons which results in mixed $sp^2$ and $sp^3$ bonds. The bond ratio can be varied by varying the process parameters, for example the ratio of gases and DC voltage, with resultant changes in properties. The bond ratio can be directly measured using, for example, Raman spectroscopy.

Relatively large areas can be coated quite quickly. For example using a PICVD low pressure non equilibrium process a 20-100 nm coating can be applied to a glass cloth surface approximately 1 sq ft in area in minutes. To control or optimize the coating parameters to reduce, for example, the stress in the coating the DLC can be applied to a bare substrate or substrates that have other coatings. The DLC can be continuous or have gaps in the coverage. Gaps may be advantageous, for example, in allowing for better bonding of an impregnated resin.

In thermal conductivity, phonon transport is enhanced and phonon scattering reduced by ensuring the length scales of the structural elements are shorter than or commensurate with the phonon distribution responsible for thermal transport. Larger HTC particulate materials can actually increase phonon transport in their own right, however, smaller HTC materials can alter the nature of the host matrix, thereby affect a change on the phonon scattering. This may be further assisted by using nano-particles whose matrices are known to exhibit high thermal conductivity and to ensure that the particle size is sufficient to sustain this effect and also to satisfy the length scale requirements for reduced phonon scattering. It is also necessary to consider the choice of structures that are more highly ordered including reacted dendrimer lattices having both short and longer range periodicity and ladder or ordered network structures that may be formed from matrices.

Applying a DLC to particles of nano, meso, micro and larger dimensions enables the size and shape of the high thermal conductivity particles to be engineered, so benefit can be obtained from percolation effects occurring naturally or created. In one example a DLC is applied to quasi-continuously coat the surface of a glass fiber or number of fibers. The surface of the fiber before coating is chosen to promote the desired properties from the coating. The fiber is then broken up by mechanical or other means into short DLC coated rods of the desired dimensional distribution. In another example a DLC coating is applied to flake-shaped particles having a high surface to thickness ratio, mica flakelets and BN particles being examples.

In poly-crystalline and mono-crystalline nano-particulate form, the particles may associate with the surface of a carrier particle, e.g. silica. Silica by itself is not a strong thermally conducting material, but with the addition of a surface coating it may become more highly thermally conducting. Silica and other such materials, however, have beneficial properties such as being readily formed into rod-shaped particles, as discussed above. In this manner, various HTC properties can be combined into one product. These coatings may also have application to the latter resin impregnation and to the glass components of the insulating tape.

Additionally, fluid flow fields and electric and magnetic fields can be applied to the HTC materials to distribute them. By using alternating or static electric fields, the rod and platelet shapes can be aligned on a micro-scale. This creates a material that has different thermal properties in different directions. The creation of an electric field may be accomplished by a variety of techniques known in the art, such as by attaching electrodes across an insulated electrical conductor or by use of a conductor in the centre of a material or the insulation system.

In another embodiment the present invention provides for new electrical insulation systems based on organic-inorganic composites. The interface between the various inorganic and organic components is made to be chemically and physically intimate to ensure a high degree of physical continuity between the different phases and to provide interfaces which are mechanically strong and not prone to failure during the operation of the electrical insulation system in service in both high and low voltage applications. Such materials have applications in high voltage and low voltage electrical insulation situations where enhanced interfacial integrity would confer advantage in terms of enhanced power rating, higher voltage stressing of the insulation systems, reduced insulation thickness and would achieve high heat transfer.

A particular embodiment uses a variety of surface treatments, nano, meso and micro inorganic fillers, so as to introduce a variety of surface functional groups which are capable of compatibilizing the inorganic surface with respect to the matrix or to allow chemical reactions to occur with the host matrix. These surface functional groups may include hydroxyl, carboxylic, amine, epoxide, silane or vinyl groups which will be available for chemical reaction with the host organic matrix. These functional groups may be applied using wet chemical methods, non-equilibrium plasma methods, chemical vapour and physical vapour deposition, sputter ion plating and electron and ion beam evaporation methods.

In one embodiment the present invention provides for an HTC paper that comprises a host matrix, such as mica, and HTC materials impregnated into the host matrix. The HTC materials are comprised of at least one of nanofillers, diamond like coatings directly on the host matrix, and diamond like coatings on the nanofillers.

In a particular embodiment the HTC materials comprise 0.1-65% by volume of the HTC paper, and in a further particular embodiment the HTC materials comprise 1-25% by volume of the HTC paper. The resistivity of the HTC paper is about $10^{12}$-$10^{16}$ Ohm cm and the thermal conductivity of the paper after impregnation with a resin is greater than 0.5 W/mK.

In other particular embodiments the nanofillers have an aspect ratio greater than 5, and may also contain dendrimers. They may be combined into a HTC electrical insulation tape, and other components of the tape may also contain HTC materials.

In another embodiment the present invention provides for an electrically insulating tape that comprises a mica paper layer with impregnated HTC materials, a glass fiber backing layer, and an interface between the mica paper layer and the glass fiber backing layer. Resin is impregnated through the mica paper layer and the glass fiber backing layer. The HTC materials are comprised of at least one of nanofillers, diamond like coatings directly on the host matrix, and diamond like coatings on the nanofillers, and comprise 1-25% by volume of the mica paper.

In still another embodiment the present invention provides for a method of making HTC paper that comprises obtaining a substrate and adding HTC materials onto the substrate, where the HTC materials comprise nanofillers that are added into the substrate by at least one of introducing a solvent containing the nanofillers onto the substrate then evaporating the solvent, and adding the nanofillers as a dry powder to the substrate, where the dry powder contains a polymer, then melting the dry powder onto the substrate. A paper product is then produced from the substrate. The nanofillers may be surface coated, such as by a DLC and the HTC paper may be combined into a HTC electrical insulation tape.

In another embodiment the method comprises a method of making HTC paper that comprises obtaining a substrate, such as mica, and added HTC materials onto the substrate. The substrate is then turned into a paper product where the HTC materials comprise a surface coating, such as a DLC, that have dispersed onto the substrate by deposition.

Another embodiment provides for method of making HTC paper that comprises obtaining a substrate and introducing the substrate into a paper making slurry. HTC materials are added to the paper making slurry such that the HTC materials mix into the substrate, and the slurry is run though a paper making process. Often there are polymers present at this point to allow the substrate to bind to itself better. The HTC materials comprise nanofillers that mix into the substrate by using the slurry as a solvent.

In another embodiment there is provided a method of making HTC paper that comprises obtaining a host matrix, which is a formed electrically insulating paper product and impregnating HTC materials onto the host matrix. The HTC materials mix into the substrate, such that the HTC bind to the material that makes up the paper. If the HTC materials are nanofillers they are added by mixing the nanofillers with a solvent, impregnating the solvent onto the host matrix, and evaporating the solvent. If the HTC materials are a DLC it is added to the host matrix by deposition.

This paper may then be combined into a HTC electrical insulation tape. The HTC materials can be added in whole or in part prior to the paper being combined into the tape, or the HTC materials can be added in whole or in part after the paper being combined into the tape.

The HTC materials loaded into resins are of a variety of substances that can be added so that they may physically and/or chemically interact with or react with the resins to improve thermal conductivity. In one embodiment, the HTC materials are dendrimers, and in another embodiment they are nano or micro inorganic fillers having a defined size or shape including high aspect ratio particles with aspect ratios (ratio mean lateral dimension to mean longitudinal dimension) of 3 to 100 or more, with a more particular range of 10-50.

As discussed above, the loaded resins may be applied to composite tapes, such as a mica-glass or mica-polymer tape. The thermal conductivity of these composite tapes is of course limited in part by the thermal conductivity of the mica layer. The mica, however, is relatively dense and HTC materials loaded in the resin will not travel into the mica layer as readily as the rest of the tape.

To overcome this, in one embodiment the present invention provides for a method of impregnating a composite tape with an HTC loaded resin by first filling voids in the porous media, which in a composite tape is the fabric backing, e.g. the glass or polymer layer(s) and other organic and inorganic fibers incorporated into fabric and/or textile structures, with HTC particles prior to resin impregnation. In one embodiment this can be done before the fabric layer is joined to the rest of the composite tape, by first filling or partially filling the voids in the porous mica paper component but for engineering considerations the particles may also be added at the whole dry tape stage. The voids are filled with dry HTC particles. The HTC materials can be inserted into the porous media by a carrier liquid medium such as a solvent or resin impregnation, or for example via vacuum pressure impregnation. These techniques apply to the glass fabric or porous phase alone if one must ensure the particles to be impregnated into the mica do not go in at this stage. By using a vacuum pressure impregnation technique the resin content can be minimized while still retaining sufficient adhesion to bond particles at their point of contact, which gives structural strength and easier subsequent impregnation. Other techniques for inserting the HCT materials into the porous media of the composite tape include dry packing by use of various techniques such as powder spraying, sprinkling and other methods known in the art. In one embodiment the filled fabric layer is then sealed with a semiporous coating that will be permeable and in some cases soluble to the later added impregnating resin and which acts to hold in the HTC particles. The coating can be a layer or film, and can itself be an HTC loaded resin compound. In particular embodiments optimized density considerations need to be maintained so that packing is done to maximize filling ratio of free space as an end point, while recognizing that particle mobility is required to achieve this, while subsequently fulfilling the optimized loading of the mica.

In addition to dry particles filling the fabric layer, the particles may be mixed with some amount of bonding resins; these resins being soluble to the later added impregnating resin. The bonding resins may be present to hold the particles in the voids in the fabric during handling and may also be used to bond the glass fabric layer to the mica paper layer in the composite tape, which also avoids dusting or mechanical loss of the HTC particles. A backcoating to hold the particles in place will thus be less important depending on the amount of bonding resin used, but can still be used for added security. The particles mixed with bonding resins may be used in substitution of or in addition to straight dry particles. As used herein, the terms HTC materials and HTC particles are used somewhat interchangeably. Although "material" tends to refer to what an item is made of, and "particles" refers to that material in a certain particle-like form (such as a nanofiller), the two terms can often be interposed.

The size of the HTC particles used to fill the fabric will be of a range selected on the dual objectives of having a percentage being mobile in the impregnated resin as well as a percentage being relatively stationary. In this manner, when the impregnating resin is added, the smaller particles are carried with the impregnating resin into the porous mica layer, while the larger particles will tend to stay dispersed in the fabric layer. Smaller particles will be in the 5-100 nm range of the HTC particles discussed herein. For impregnation into the mica layer, the shapes of these smaller particles will favor spheroids and platelets, with aspect ratios in about the 1-5 range. Although the particles at the lower end of the small particles range can have aspect ratios of 1-10 or greater and still have good impregnation into the mica layer. The overall percentage of particles that are smaller particles will vary depending on other factors discussed, but should be at least 5% by volume of the total amount of particles in the composite tape structure.

Where possible, the smaller particles should be located closer to the mica layer. This can be done if the particles are added to the fabric in stages. Enhancements to this, however, include adding the particles to voids between the fabric and mica layers in the tape, as well as within the voids of the mica layer itself.

The larger particles with higher aspect ratios will tend to stay closer to the point of resin impregnation, so it is important to have a sufficient percentage of them to keep an even distribution of particles in the fabric layer. Some of the relatively larger particles will, however, be carried to the fabric/mica interface. These, as well as some of the smaller particles, will not penetrate into the mica layer; therefore, a higher local density of particles will accumulate at the interface. This higher density of particles at the interface will not only aid in the thermal conductivity between the layer, which actually tends to be weak, but will also increase the transverse conductivity in the plane of the tape.

The particles can have surface functionalizations to perform a variety of objectives. For instance, they may be functionalized so as not to interact with one another and therefore disperse better. Other surface functionalizations can include the ability of the particles to graft to the impregnated resin or to self aggregate; although, for the smaller particles at least, this should occur after they have penetrated into the mica layer. Conversely, the larger particles may be surface functionalized to aggregate and/or graft quickly to the resin to fulfill uniform dispersion objective within the fabric layer.

The impregnating resin itself does not have to have particles loaded into it prior to impregnation, but it may indeed have them. These particles can be of a variety of shapes and sizes, and may be grafted or ungrafted to the resin. In some embodiments these particles loaded into the resin prior to impregnation may enhance or even substitute the relatively larger filler particles discussed above aimed to keep a uniform dispersion of particles within the fabric layer. The loaded resin may be used in conjunction with a particular technique for surface functionalization where the resin introduces seed particles that pick up building block particles within the filled tape to create dendritic type structures.

Since the method of first loading the fabric and then impregnating the mica will transport a greater number of HTC materials into the mica, in some embodiments the mica layer can be made thinner and denser than is currently used in the art. This will allow for composite tapes with high dielectric strength, voltage endurance and thermal conductivity but with reduced thickness. Since the many layers of tape are wound around electrical conductors, this will allow for either the overall reduced thickness of the tape layers, or an increased number of layers at the same overall thickness.

Referring to FIG. 1 a typical composite tape 56 used with the present invention is shown. The mica layer 52 is comprised of many mica flakes 54, which are packed in a layered manner at a much greater density than the illustration suggests. The mica layer is bonded to a fabric backing, such as a glass fabric layer 51, using a bonding resin. The filler particles may be added to any part of the composite tape structure prior to resin impregnation. An additional backing 58 may be present on one or both sides, particularly if dry filler particles are used. The layers depicted are stylized for illustration purposes and are not to exact scale. The two layers 52, 51 tend to be bonded together with a bonding resin 55, and this may be a location for additional filler particles to be added. The entire tape is later impregnated with an impregnating resin from the fabric said. A typical impregnating resin being Micalastic™ resin.

In one embodiment of the present invention as used for impregnating a composite tape with HTC particles provides for permeating a fabric layer of the composite tape with HTC particles and impregnating an impregnating resin into the composite tape through the fabric layer. At least 1% of the HTC particles, and more particularly 5% of the particles, permeated into the fabric layer are carried out of the fabric layer and into a mica layer bound to the fabric layer by the impregnating resin. In some embodiments the impregnating resin itself contains HTC particles.

In particular embodiments the permeating of the fabric layer is performed after the fabric layer is bound to the mica layer, and the fabric layer can have a resinous backcoating on a side opposite to the side which the mica layer is bound, whereby the resinous backcoating keeps the HTC particles within the fabric layer.

In other related embodiments the HTC particles are comprised of a mixture of small and larger groups of particles, and where the small group comprise particles in the 5-100 nm in length with aspect rations of 1-10 and comprises at least 5% of the total volume of HTC particles in the composite tape, and the larger groups of particles is generally greater than 100 nm in length. The small group of particles is comprised predominately of spheroid and platelet shapes.

In still other related embodiments, approximately 10% by volume of HTC particles accumulate at the fabric layer/mica layer interface, whereby a region of densely packed HTC particles is created at the interface. The HTC particles are dry when they are permeated into the fabric layer, or the HTC particles are mixed with resin when they are permeated into the fabric layer. The HTC particles comprise at least one of oxides, nitrides, and carbides, and more particularly, Al2O3, AlN, MgO, ZnO, BeO, BN, Si3N4, SiC or SiO2 with mixed stoichiometric and non-stoichiometric combinations, and are from 1-1000 nm in length, and high thermal conductivity fillers have an aspect ratio of between 3-100.

In another embodiment of the present invention as used for impregnating a composite tape with HTC particles provides for dry packing a fabric layer of the composite tape with HTC particles, the HTC particles comprise a mixture of smaller and larger particles. Then sealing exposed surfaces of the fabric layer with a resin layer, and impregnating the composite tape with an impregnating resin. The resin layer is soluble in the impregnating resin, and the impregnating resin flows from the fabric layer into a mica layer bound to the fabric layer. At least 5% of the HTC particles in the fabric layer is carried by the impregnating resin into the mica layer, and where the smaller particles tend to be carried further than the larger particles, and some of the HTC particles remain at the fabric layer/mica layer interface whereby creating a region with a higher concentration of HTC particles. The HTC particles are least one of oxides, nitrides, and carbides.

In some embodiments HTC particles have been surface functionalized, for instance, the smaller particles have been surface functionalized to limit interaction with other smaller particles. The HTC particles comprise 0.1-65% by volume of composite tape, and more particularly, 1-25% by volume.

In still another embodiment of the present invention as used for impregnating a composite tape with HTC particles provides for joining a mica layer to at least one fabric layer and packing the fabric layer with HTC particles. Then sealing exposed surfaces of the fabric layer with a resin layer, and impregnating the composite tape with an impregnating resin, after the tape is used to insulate a conductor or other electrical device. At least 5% of the HTC particles in the fabric layer is carried by the impregnating resin into the mica layer.

Although the porous media has been primarily discussed in terms of a fabric layer and mica paper for tapes, the present invention will also work for other layered insulation composites such as those for circuit boards and press board laminates where filler particle loading of the glass for better packing of the particles can be achieved.

Although the present invention has been discussed primarily in use with electrical industries, the invention is equally applicable in other areas. Industries that need to increase heat transference would equally benefit from the present invention. For example, the energy, chemical, process and manufacturing industries, inclusive of oil and gas, and the automotive and aerospace industries. Other focuses of the present invention include power electronics, conventional electronics, and integrated circuits where the increasing requirement for enhanced density of components leads to the need to remove heat efficiently in local and large areas. Also, while specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method for impregnating a composite tape with high thermal conductivity (HTC) particles comprising:
   permeating a fabric layer of said composite tape with HTC particles; and
   impregnating an impregnating resin into said composite tape through said fabric layer;

wherein said permeating comprises selectively permeating the fabric layer with a first group of the HTC particles that will be mobile in the impregnating resin during said impregnating and selectively permeating the fabric layer with a second group of the HTC particles that will remain stationary in the fabric layer during said impregnating; and wherein, during said impregnating, at least 1% of said first group and said second group of HTC particles permeated into said fabric layer are carried out of said fabric layer and into a mica layer bound to said fabric layer by said impregnating resin.

2. The method of claim 1, wherein the permeating of said fabric layer is performed after said fabric layer is bound to said mica layer.

3. The method of claim 2, wherein said fabric layer has a resinous backcoating on a side opposite to the side to which said mica layer is bound, and wherein said resinous backcoating keeps said second group of HTC particles within said fabric layer.

4. The method of claim 1, wherein the first group of HTC particles comprises particles that are 5-100 nm in length with aspect ratios of 1-10 and comprises at least 5% of a total volume of said first group and said second group of HTC particles in said composite tape, and said second group of HTC particles comprises particles that are greater than 100 nm in length.

5. The method of claim 4, wherein said small first group of particles comprises spheroid and platelet shapes.

6. The method of claim 1, wherein said impregnating resin comprises HTC particles.

7. The method of claim 1, wherein an amount of said first group and said second group of HTC particles accumulates at the fabric layer/mica layer interface, and wherein a region of densely packed HTC particles is created at the fabric layer/mica interface.

8. The method of claim 1, wherein said first group and said second group of HTC particles are dry when they are permeated into said fabric layer.

9. The method of claim 1, wherein said first group and said second group of HTC particles are mixed with at least one of resin or solvent when they are permeated into said fabric layer.

10. The method of claim 1, wherein said first group and said second group of HTC particles comprise at least one of oxides, nitrides, or carbides.

11. The method of claim 10, wherein said first group and said second group of HTC particles comprise at least one of $Al_2O_3$, AlN, MgO, ZnO, BeO, BN, $Si_3N_4$, SiC or $SiO_2$ with mixed stoichiometric and non-stoichiometric combinations.

12. The method of claim 1, wherein said first group and said second group of HTC particles are from 1-1000 nm in length, and wherein said HTC particles have an aspect ratio of between 3 and 100.

13. A method for impregnating a composite tape with high thermal conductivity (HTC) particles comprising:
    packing a fabric layer of said composite tape with HTC particles;
    sealing exposed surfaces of said fabric layer with a resin layer; and
    impregnating said composite tape with an impregnating resin through the fabric layer;
    wherein said resin layer is soluble in said impregnating resin;
    wherein said packing comprises selectively packing the fabric layer with a first group of the HTC particles that will be mobile in the impregnating resin during said impregnating and selectively packing the fabric layer with a second group of the HTC particles that will remain stationary in the fabric layer during said impregnating; and
    wherein said impregnating resin flows from said fabric layer into a mica layer bound to said fabric layer;
    wherein, during said impregnating, at least 5% of said first group and said second group of HTC particles in said fabric layer are carried by said impregnating resin out of the fabric layer and into said mica layer; and
    wherein approximately 10% by volume of said first group and said second group of HTC particles remain at the fabric layer/mica layer interface whereby a region is created with a higher concentration of HTC particles.

14. The method of claim 13, wherein said first group and said second group of HTC particles comprise at least one of oxides, nitrides, or carbides.

15. The method of claim 13, wherein said first group and said second group of HTC particles have been surface functionalized.

16. The method of claim 15, wherein said first group of particles have been surface functionalized to limit interaction with other ones of the first group of particles.

17. The method of claim 1, wherein said first group and said second group of HTC particles comprise 0.1-65% by volume of composite tape.

18. The method of claim 17, wherein said first group and said second group of HTC particles comprise 1-25% by volume of composite tape.

19. A method for impregnating a mica layer within a composite tape, comprising:
    joining a mica layer to at least one fabric layer;
    packing said fabric layer with high thermal conductivity (HTC) particles;
    sealing exposed surfaces of said fabric layer with a resin layer; and
    impregnating said composite tape with an impregnating resin;
    wherein said packing comprises selectively packing the fabric layer with a first group of the HTC particles that will be mobile in the impregnating resin during said impregnating and selectively packing the fabric layer with a second group of the HTC particles that will remain stationary in the fabric layer during said impregnating; and
    wherein at least 5% of said first group and said second group of HTC particles in said fabric layer is carried by said impregnating resin out of said fabric layer and into said mica layer.

20. The method of claim 13, wherein said packing a fabric layer of said composite tape with HTC particles is done via vacuum pressure impregnation.

* * * * *